United States Patent
Wada et al.

(10) Patent No.: US 6,918,605 B2
(45) Date of Patent: Jul. 19, 2005

(54) INVERTED TYPE FRONT FORK IN TWO-WHEELED VEHICLE OR THE LIKE

(75) Inventors: Kazuo Wada, Shizuoka (JP); Shinichi Oba, Shizuoka (JP); Takao Tomonaga, Shizuoka (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/722,258

(22) Filed: Nov. 25, 2003

(65) Prior Publication Data

US 2005/0073128 A1 Apr. 7, 2005

(30) Foreign Application Priority Data

Jun. 10, 2003 (JP) ........................................ 2003-165729

(51) Int. Cl.[7] ............................................. B62K 21/18
(52) U.S. Cl. ........................................ 280/279; 280/276
(58) Field of Search ................................ 280/276, 277, 280/278, 279, 280; 180/219, 227

(56) References Cited

U.S. PATENT DOCUMENTS

| | | | | |
|---|---|---|---|---|
| 4,561,669 A | * | 12/1985 | Simons | ...................... 280/276 |
| 5,088,705 A | * | 2/1992 | Tsai | ........................... 267/226 |
| 5,810,380 A | * | 9/1998 | Lin | .............................. 280/279 |
| 6,036,212 A | * | 3/2000 | Baldomero | ................. 280/276 |
| 6,155,541 A | * | 12/2000 | Farris et al. | ............. 267/64.15 |
| 6,260,870 B1 | * | 7/2001 | Fan | ............................. 280/276 |
| 6,604,886 B2 | * | 8/2003 | Kinzler et al. | .............. 403/370 |

FOREIGN PATENT DOCUMENTS

JP             2541848        4/1997

* cited by examiner

Primary Examiner—Avraham Lerner
(74) Attorney, Agent, or Firm—Orum & Roth LLC

(57) ABSTRACT

An inverted type front fork in a two-wheeled vehicle or the like, wherein an annular groove in which both end portions in an axial direction are closed is formed in an upper inner periphery of an outer tube, and an annular bush having a closed gap in a free state is attached to the annular groove, and an annular gap between an inner periphery of the outer tube and an outer periphery of the inner tube forms a smaller thickness than the bush.

5 Claims, 6 Drawing Sheets

INVERTED TYPE FRONT FORK IN TWO-WHEELED VEHICLE OR THE LIKE

BACKGROUND OF THE INVENTION

1. Field of the Invention

The present invention relates to an inverted type front fork in a two-wheeled vehicle or the like. An attachment portion for a bush guiding an inner tube in a side of an axle is formed in upper and lower sides of an outer tube in a side of a vehicle body.

2. Description of the Related Art

In Japanese Utility Model Application Publication No. 2541848 (reference document 1), there is disclosed a front fork in which an upper bearing attachment portion 41 constituted by a step portion open to an upper side is formed in an inner periphery of a vehicle body side tube 1. The upper bearing attachment portion 41 is formed by partly cutting the inner periphery of the vehicle body side tube 1 along an axial direction from the upper side and leaving the step portion. An upper bearing member 4 is inserted to the upper bearing attachment portion 41 from an upper direction so as to be assembled in the upper bearing attachment portion 41.

In the front fork, in the reference document 1, it is necessary to cut a long portion extending along an axial direction from an upper end portion of the inner periphery of the vehicle body side tube to the upper bearing attachment portion 41. Working time is extended, and working efficiency is deteriorated.

Further, the upper bearing member 4 is assembled in the upper bearing attachment portion 41 by press fitting. However, since the upper bearing attachment portion 41 has no means for preventing the upper bearing member 4 from coming off to the upper side, there is a risk that a displacement may occur, such as the upper bearing member 4 coming off to the upper side during use.

SUMMARY OF THE INVENTION

An object of the present invention in an inverted type front fork in a two-wheeled vehicle or the like is to improve the working efficiency of an attachment portion for an upper bush formed in an inner periphery of an outer tube, and to prevent the upper bush from being displaced in an axial direction.

The present invention relates to an inverted type front fork in a two-wheeled vehicle or the like in which an attachment portion for a bush guiding an inner tube in a side of an axle is formed in upper and lower sides of an inner periphery of an outer tube in a side of a vehicle body. An annular groove in which both end portions in an axial direction are closed is formed in an upper inner periphery of the outer tube, and an annular bush having a closed gap in a free state is attached to the annular groove. An annular gap between an inner periphery of the outer tube and an outer periphery of the inner tube is formed smaller than the thickness of the bush.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 3A and 3B show an outer tube, in which FIG. 3A is a general cross sectional view and FIG. 3B is an enlarged cross sectional view of a main portion;

FIGS. 5A and 5B show a bush, in which FIG. 5A is a front elevational view and FIG. 5B is an end elevational view;

DESCRIPTION OF THE PREFERRED EMBODIMENTS

Figure 1:
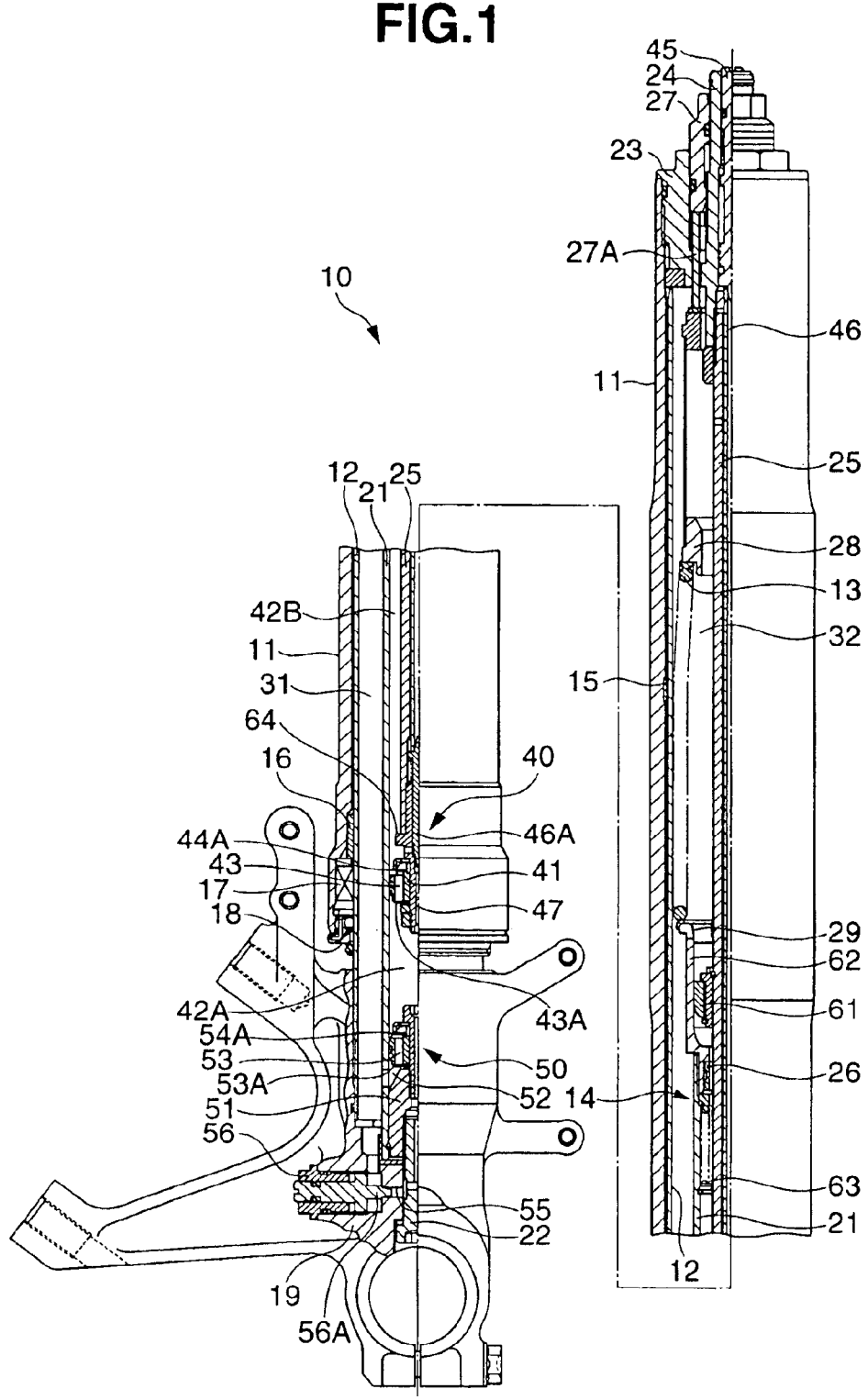
FIG. 1 is a general cross sectional view showing a front fork.
Figure 2:
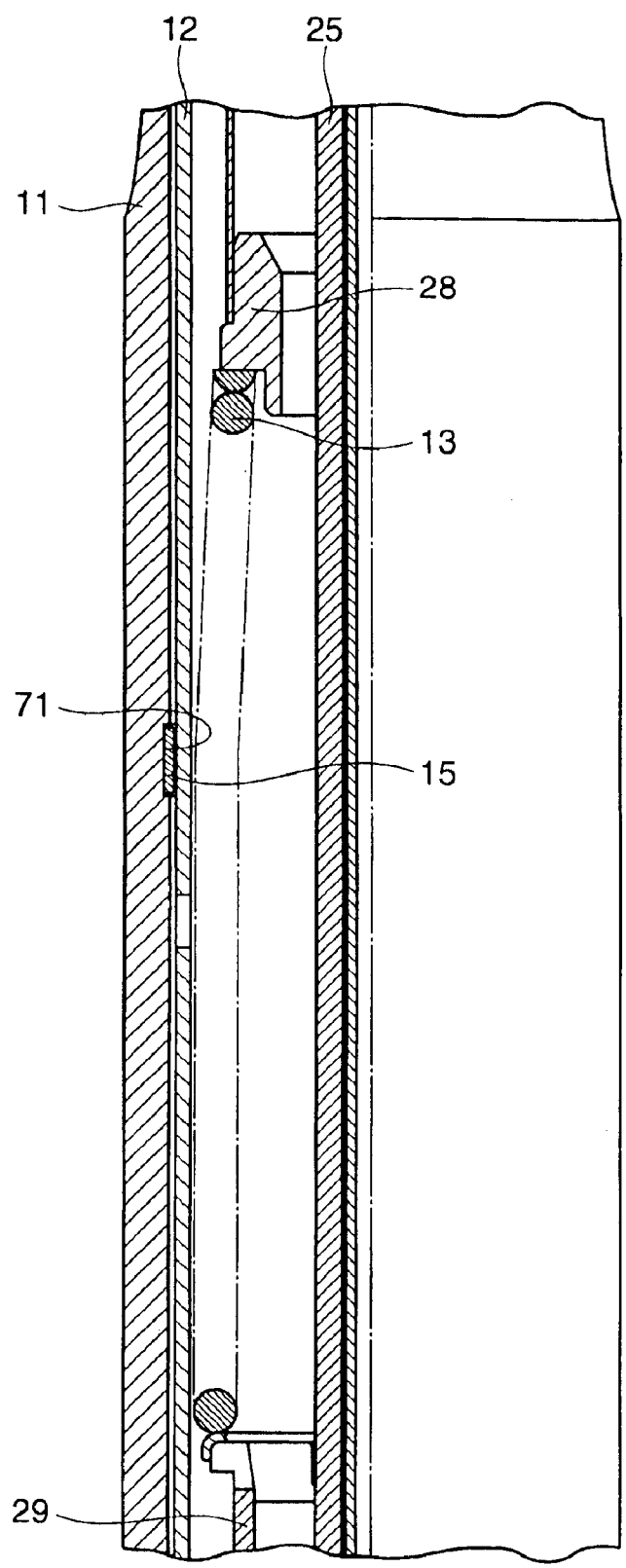
FIG. 2 is a cross sectional view showing a portion around an upper bush in an enlarged manner.
Figure 3A:
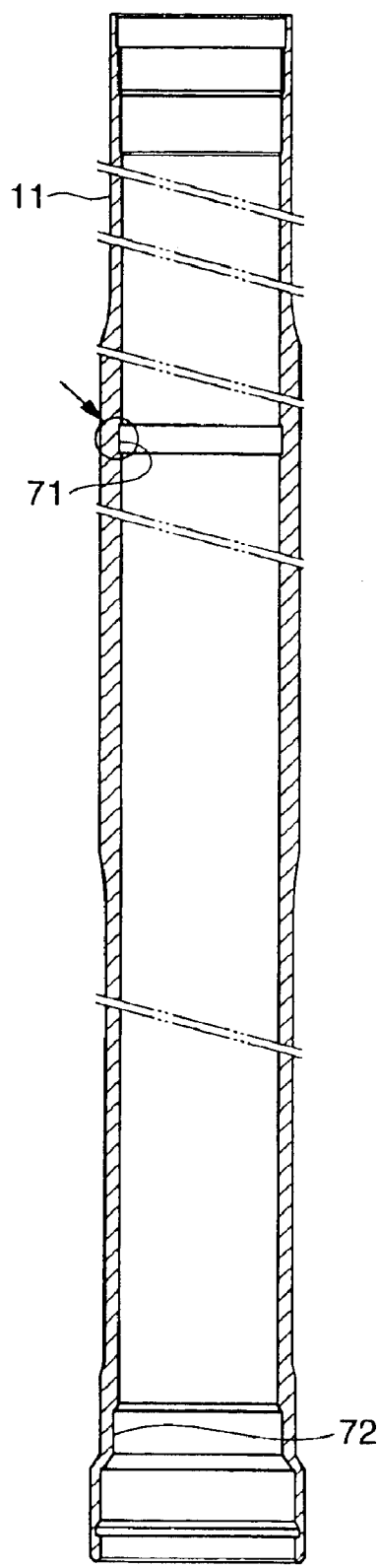
Figure 3B:
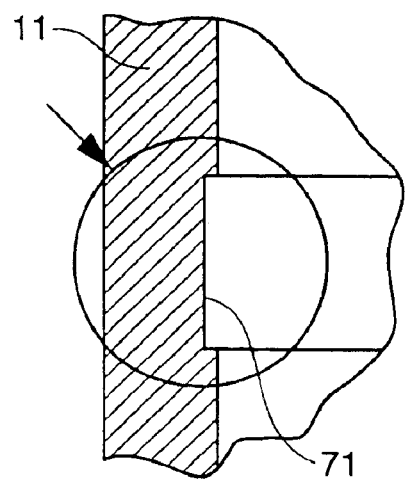
Figure 4:
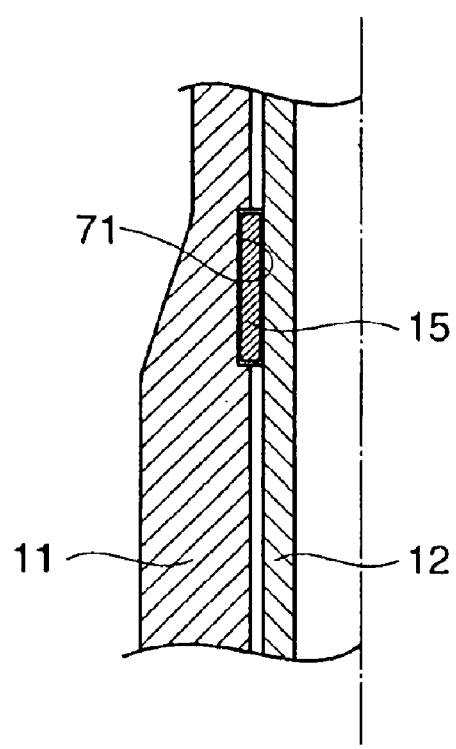
FIG. 4 is a schematic view showing an attachment portion of the upper bush.

An inverted type front fork 10 in a two-wheeled vehicle or the like is structured, as shown in FIG. 1, such that an inner tube 12 in a side of an axle is slidably inserted to an outer tube 11 in a side of a vehicle body so as to be inverted. A suspension spring 13 is interposed between both the tubes 11 and 12, and a single tube type damper 14 is internally provided in a normally erected state.

Upper and lower bushes 15 and 16 guiding the inner tube 12 are fitted and attached to two positions at upper and lower positions in an inner periphery of the outer tube 11. An oil seal 17 and a dust seal 18 are fitted and attached to an inner peripheral portion of a lower end of the outer tube 11.

The outer tube 11 is supported to the side of the vehicle body via upper and lower brackets (not shown). The inner tube 12 is connected to the axle via an axle bracket 19.

A lower end portion of a damper cylinder 21 in the damper 14 is fixed to a bottom portion of the axle bracket 19 by a bottom bolt 22 so as to be provided in a rising manner. A cap 23 is screwed to an upper end portion of the outer tube 11. A hollow piston rod 25 is screwed to a rod connection portion 24 provided in a center portion of the cap 23. A leading end portion of the piston rod 25 is inserted to an inner portion of the damper cylinder 21 while guiding along an inner periphery of a rod guide 26 provided in an upper end opening portion of the damper cylinder 21 in a slidably contacting manner.

A spring load adjusting sleeve 27 is screwed to a portion in the periphery of the rod connection portion 24 of the cap 23. A pushing rod 27A pushed by the spring load adjusting sleeve 27 supports a spring receiver 28 in an inner portion of the outer tube 11. A spring receiver 29 is press fitted to an upper end outer peripheral portion of the damper cylinder 21, in the inner portion of the inner tube 12. The suspension spring 13 mentioned above is interposed between the spring receiver 28 and the spring receiver 29. The spring receiver 28 is vertically moved on the basis of a rotating operation of the spring load adjusting sleeve 27, whereby it is possible to adjust an initial load of the suspension spring 13.

An oil reservoir chamber 31 and a gas chamber 32 are provided in an outer peripheral portion of the damper cylinder 21, in the inner portion of the outer tube 11 and the inner tube 12. A working fluid in the oil reservoir chamber 31 contributes to lubrication in the bushes 15 and 16. The suspension spring 13 and a gas spring in the gas chamber 32 absorb an impact force applied to the vehicle from a road surface.

The damper 14 has a piston valve apparatus 40 (an expansion side damping force generating apparatus) and a bottom valve apparatus 50 (a compression side damping force generating apparatus). The damper 14 damps an expansion and contracting vibration of the outer tube 11 and the inner tube 12 generated according to the absorption of the impact force by the suspension spring 13 and the gas spring, on the basis of the damping force generated by the piston valve apparatus 40 and the bottom valve apparatus 50.

The piston valve apparatus 40 is structured such that the inner portion of the damper cylinder 21 is sectioned into a piston side oil chamber 42A and a rod side oil chamber 42B by a piston 41 fixed to the leading end portion of the piston rod 25. An expansion side disc valve 43A and a compression side check valve 44A are provided respectively in an expansion side flow passage 43 and a compression side flow passage 44 which can communicate the piston side oil chamber 42A with the rod side oil chamber 42B.

The piston valve apparatus 40 is structured such that a damping force adjusting rod 45 is provided in an inner peripheral side of the rod connection portion 24. A damping force adjusting tube 46 fixed to the damping force adjusting rod 45 is passed through a hollow portion of the piston rod 25, and a flow passage area of a bypass passage 47 for the piston side oil chamber 42A and the rod side oil chamber 42B provided in the piston 41 can be adjusted by a leading end needle 46A of the damping force adjusting tube 46.

The bottom valve apparatus 50 has a bottom piece 51 screwed to the bottom bolt 22 so as to arrange the damper cylinder 21 in the bottom portion of the axle bracket 19 in a rising manner as mentioned above. The bottom valve apparatus 50 forms a bottom valve chamber 52 below the piston side oil chamber 42A in a sectioning manner. The bottom vale chamber 52 is communicated with the oil reservoir chamber 31 by an oil hole provided in the damper cylinder 21. The bottom piece 51 is provided with a compression side disc valve 53A and an expansion side disc valve 54A respectively in the compression side flow passage 53 and the expansion side flow passage 54 which can communicate the piston side oil chamber 42A with the bottom valve chamber 52.

The bottom valve apparatus 50 is provided with a bypass passage 55 for the piston side oil chamber 42A and the oil reservoir chamber 31 in the axle bracket 19, the bottom bolt 22 and the bottom piece 51. A flow passage area of the bypass passage 55 is adjustable by a leading end needle 56A of a damping force adjusting rod 56 screwed to the axle bracket 19.

Accordingly, the front fork 10 performs a damping operation in the following manner.

Compression Time

During compression of the front fork 10, the compression side damping force is generated in the bottom valve apparatus 50 by the fluid flowing through the compression side disc valve 53A of the compression side flow passage 53 or the needle 56A of the bypass passage 55. The damping force is generated at a low level in the piston valve apparatus 40.

Expansion Time

At a time of expansion of the front fork 10, the expansion side damping force is generated in the piston valve apparatus 40 by the fluid flowing through the expansion side disc valve 43A of the expansion side flow passage 43 or the needle 46A of the bypass passage 47. The damping force is generated at a low level in the bottom valve apparatus 50.

In this case, at the time of maximum compression of the front fork 10, the damping during maximum compression is achieved in the outer side of the damping cylinder 21 by fitting an oil lock piece 61 provided in the piston rod 25 to an oil lock collar 62 integrally provided in the spring receiver 29 of the leading end outer peripheral portion of the damper cylinder 21 and compressing an oil lock oil chamber of the oil lock collar 62.

During maximum expansion of the front fork 10, damping at the time of the maximum expansion is achieved by bringing a rebound spring 63 arranged in the upper end inner peripheral portion of the damper cylinder 21 into contact with a spring stopper 64 in a side of the piston 41 provided in the leading end portion of the piston rod 25.

Figure 5A:
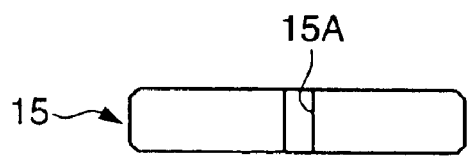
Figure 5B:
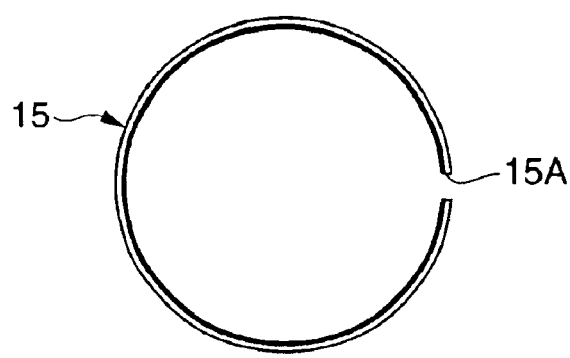

Accordingly, in the front fork 10, as shown in FIGS. 1 to 4, an annular groove 71 is formed in the upper inner periphery of the outer tube 11 by a cutting operation, and the annular upper bush 15 is attached to the annular groove 71. The annular groove 71 is constituted by a recess groove in which both end portions in an axial direction are closed by a step within the inner peripheral surface of the outer tube 11. The upper bush 15 has a closed gap 15A in a free state as shown in FIGS. 5A and 5B. The closed gap 15A is formed in a straight shape extending along the axial direction of the bush 15. The upper bush 15 is inserted from the upper end opening portion of the outer tube 11 in an elastically compressed state with respect to an inner diameter of the outer tube 11, and is elastically expanded with respect to a groove bottom of the annular groove 71.

In the assembled state of the front fork 10, an annular gap between the inner periphery of the outer tube 11 and the outer periphery of the inner tube 12 is formed smaller than the thickness of the upper bush 15.

In this case, in the lower inner periphery of the outer tube 11, the lower bush 16 is attached to an attachment portion 72 cut so as to open the lower end side in a press fitted state.

Figure 7:
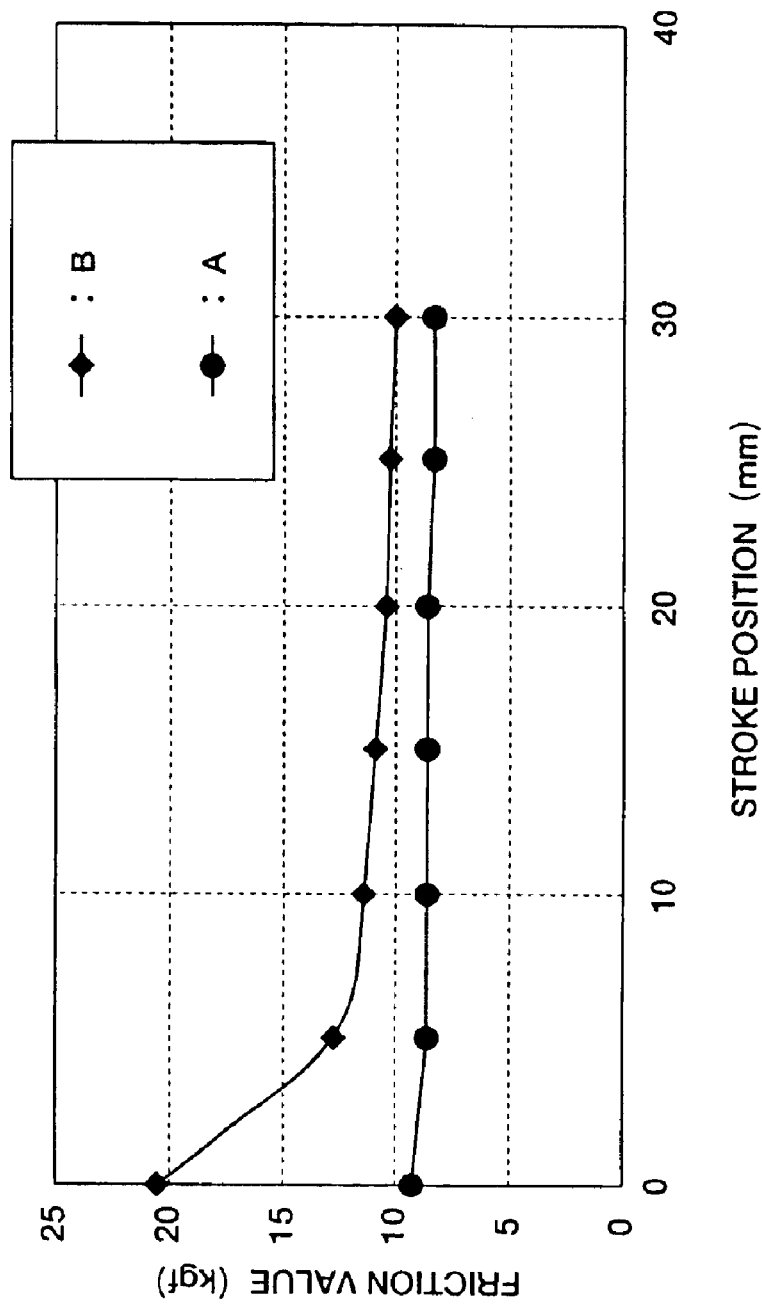
FIG. 7 is a graph showing a change in friction with respect to a stroke of the front fork.

FIG. 7 shows a friction value A which is generated at each of various stroke positions from a starting time, for example a zero stroke, during a compression and expansion stroke of the outer tube 11 and the inner tube 12 where a side force of 150 kgf is applied to the outer tube 11 and the inner tube 12 from an axial perpendicular direction of the front fork 10. A friction value B corresponds to a value in the prior art in which the upper bush is attached to the attachment portion open to the upper end side in the upper inner periphery of the outer tube 11 in a press fitted state, and the lower bush is attached to the attachment portion open to the lower end side in the lower inner periphery of the outer tube 11 in a press fitted state.

In accordance with the present embodiment, the following operation and effects can be achieved.

(1) Since it is not necessary to apply the cutting operation to the long area extending along the inner periphery of the outer tube 11 in the axial direction from the upper end portion when forming the annular groove 71 for the upper bush 15, it is possible to reduce a working time.

(2) Since the upper bush 15 is inhibited from moving in the axial direction in both end portions of the annular groove 71, the bush 15 is not displaced in the axial direction.

(3) Since the gap between the inner periphery of the outer tube 11 and the outer periphery of the inner tube 12 is made smaller than the thickness of the bush 15, the bush 15 does not fall away into the gap even when the bush 15 is compressed to an amount of the closed gap 15A.

(4) In the case of press fitting the bush to the conventional attachment portion in which one end side is open, the bush is press fitted such that the closed gap is zero. On the contrary, according to the present invention, the bush 15 is expanded within the annular groove 71 and generates the closed gap 15A. In the bush 15 according to the present invention as mentioned above, the friction becomes fixed from the initial starting time of the stroke in comparison with the conventional press fitting bush having the zero closed gap, as shown in FIG. 7. This is because of the following reason. It can be considered that since the bush 15 is not closely attached to the inner periphery of the annular groove 71, the bush 15 can be slightly expanded within the annular groove 71, so that friction at the initial starting time is reduced in comparison with the conventional press fitting bush. Since the friction is fixed, it is possible to improve a working property of the front fork 10. In particular, since friction at the initial starting time is reduced, it is possible to improve the initial working property of the front fork 10.

Figure 6A:
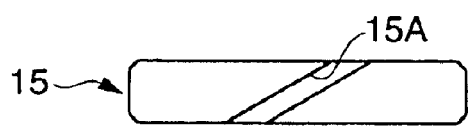
FIGS. 6A and 6B are front elevational views showing a modified example of the bush.

FIG. 6A shows a modified example of the bush 15, in which the closed gap 15A is formed to be inclined with respect to the axial direction of the bush 15.

In the bush 15 in FIG. 6A, the closed gap 15A is formed to be inclined with respect to the axial direction of the bush 15. As a result, the bearing surface of the bush 15 exists for all the area of the bush 15 in the peripheral direction. Accordingly, the portion which does not bear the outer peripheral surface of the inner tube 12 is increased in the peripheral direction of the bush 15, in comparison with the structure in which the closed gap extending along the axial direction is formed. It is possible to prevent scratches from being generated on the outer peripheral surface of the inner tube 12 on the basis of the sliding with the closed gap 15 of the bush 15.

Figure 6B:
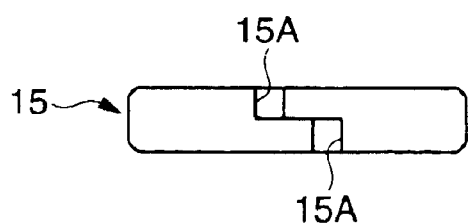

FIG. 6B shows a modified example of the bush 15, in which the closed gap 15A is formed in a step shape with respect to the axial direction of the bush 15.

As mentioned above, according to the present invention, it is possible to improve the working efficiency of the attachment portion for the upper bush formed in the inner periphery of the outer tube, and it is possible to prevent the upper bush from being displaced in the axial direction, in the inverted type front fork in the two-wheeled vehicle or the like.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An inverted type front fork usable in a two-wheeled vehicle comprising an attachment portion for a bush guiding an inner tube in a side of an axle disposed in upper and lower sides of an inner periphery of an outer tube in a side of a vehicle body, wherein an annular groove in which both end portions in an axial direction are closed is disposed in an upper inner periphery of the outer tube, and an annular bush having a closed gap in a free state is attached to the annular groove, and an annular gap between an inner periphery of the outer tube and an outer periphery of the inner tube is smaller in dimension than a thickness of the bush.

2. An inverted type front fork usable in two-wheeled vehicle according to claim 1, wherein the closed gap of the bush is inclined with respect to the axial direction of the bush.

3. An inverted type front fork usable in two-wheeled vehicle according to claim 1, wherein the closed gap of the bush is a straight shape extending along the axial direction of the bush.

4. An inverted type front fork usable in two-wheeled vehicle according to claim 1, wherein the closed gap of the bush is a step shape with respect to the axial direction of the bush.

5. An inverted type front fork usable in two-wheeled vehicle according to claim 1, wherein the annular groove is constituted by a recess groove in which both end portions in the axial direction are closed by a step portion, in an inner peripheral surface of the outer tube.

* * * * *